United States Patent
Wei (10) Patent No.: US 10,721,230 B2
(45) Date of Patent: Jul. 21, 2020

(54) UNIFIED AUTHENTICATION METHOD FOR APPLICATION IN TRUNKING SYSTEM, SERVER AND TERMINAL

(71) Applicant: CHENGDU TD TECH LTD., Chengdu (CN)

(72) Inventor: Jianmiao Wei, Chengdu (CN)

(73) Assignee: CHENGDU TD TECH LTD., Chengdu (CN)

( * ) Notice: Subject to any disclaimer, the term of this patent is extended or adjusted under 35 U.S.C. 154(b) by 362 days.

(21) Appl. No.: 15/721,449

(22) Filed: Sep. 29, 2017

(65) Prior Publication Data
US 2018/0026982 A1    Jan. 25, 2018

Related U.S. Application Data

(63) Continuation of application No. PCT/CN2016/078339, filed on Apr. 1, 2016.

(30) Foreign Application Priority Data

Apr. 2, 2015  (CN) .......................... 2015 1 0154448

(51) Int. Cl.
*H04L 29/06* (2006.01)
*H04W 4/10* (2009.01)
(Continued)

(52) U.S. Cl.
CPC ...... *H04L 63/0876* (2013.01); *H04L 63/0807* (2013.01); *H04L 63/0815* (2013.01);
(Continued)

(58) Field of Classification Search
None
See application file for complete search history.

(56) References Cited

U.S. PATENT DOCUMENTS 8,667,579 B2 * 3/2014 Leeder ................. H04W 12/06
726/20
8,856,878 B2 * 10/2014 Wohlert ............... H04L 63/101
726/3
(Continued)

FOREIGN PATENT DOCUMENTS

CA    2 571 255 A1    12/2014
CN    102904895 A    1/2013
(Continued)

OTHER PUBLICATIONS

Zhao, Ying et al. Application Smart Grid to Trunk System for Emergency Communication. 2012 IEEE 12th International Conference on Computer and Information Technology. https://ieeexplore.ieee.org/stamp/stamp.jsp?tp=&arnumber=6392030 (Year: 2012).*
(Continued)

*Primary Examiner* — Jeremiah L Avery
(74) *Attorney, Agent, or Firm* — J.C. Patents (57) ABSTRACT

Embodiments of the present disclosure provide a unified authentication method for application in a trunking system, a server and a terminal. The method includes: an application service network element of a server receives a registration request transmitted by a terminal and transmits the registration request to an authorization authentication network element, where the registration request carries a token indicating a unique identity of a user initiating the registration request, and the token is assigned by the authorization authentication network element of the server to the user when the user logs onto the terminal; the authorization authentication network element then performs a token authorization to the user according to the token; and finally the application service network element performs an application service interaction with the terminal if the token authorization is passed.

21 Claims, 6 Drawing Sheets

(51) Int. Cl.
*H04W 60/00* (2009.01)
*H04W 12/06* (2009.01)
*H04W 12/08* (2009.01)

(52) U.S. Cl.
CPC ............... *H04L 63/10* (2013.01); *H04W 4/10* (2013.01); *H04W 60/00* (2013.01); *H04L 63/08* (2013.01); *H04W 12/06* (2013.01); *H04W 12/08* (2013.01)

(56) References Cited

U.S. PATENT DOCUMENTS

| | | | |
|---|---|---|---|
| 2007/0240206 A1 | 10/2007 | Wu et al. | 726/8 |
| 2009/0271847 A1* | 10/2009 | Karjala | H04L 63/0807 726/6 |
| 2012/0072979 A1* | 3/2012 | Cha | H04W 12/0609 726/7 |
| 2012/0233668 A1* | 9/2012 | Leafe | G06F 9/45558 726/4 |
| 2012/0284190 A1* | 11/2012 | Wu | H04L 63/12 705/44 |
| 2014/0198687 A1* | 7/2014 | Raleigh | G06Q 20/20 370/259 |
| 2014/0248852 A1* | 9/2014 | Raleigh | H04M 15/58 455/407 |
| 2014/0282889 A1* | 9/2014 | Ishaya | G06F 9/5072 726/4 |

FOREIGN PATENT DOCUMENTS

| | | |
|---|---|---|
| CN | 103051631 A | 4/2013 |
| CN | 103139168 A | 6/2013 |
| CN | 103188248 A | 7/2013 |
| EP | 2 809 042 A1 | 12/2014 |

OTHER PUBLICATIONS

Herrigel, Alexander; Lai, Xuejia. Authentication and Authorization in the IN. Workshop on Intelligent Network. https://ieeexplore.ieee.org/stamp/stamp.jsp?tp=&arnumber=729161 (Year: 1994).*

The extended European Examination Report of corresponding European patent application No. 16771423.7-1218/3267704, dated Jun. 14, 2018.

International Search Report of corresponding International PCT Application No. PCT/CN2016/078339, dated Jun. 16, 2016.

* cited by examiner

UNIFIED AUTHENTICATION METHOD FOR APPLICATION IN TRUNKING SYSTEM, SERVER AND TERMINAL

CROSS-REFERENCE TO RELATED APPLICATIONS

This application is a continuation of International Application No. PCT/CN2016/078339, filed on Apr. 1, 2016, which claims priority to Chinese Patent Application No. 201510154448.3, filed on Apr. 2, 2015. The disclosures of the aforementioned applications are hereby incorporated by reference in their entireties.

TECHNICAL FIELD

Embodiments of the present disclosure relate to a trunking system and, in particular, to a unified authentication method for application in a trunking system, a server and a terminal.

BACKGROUND

The trunking system is a dedicated wireless communication system directed to an industry-specific application, which is developed to meet needs of commanding and dispatching by a user within the industry.

A long-term evolution (LTE)-based broadband trunking system is gradually evolving towards user-based service management. A user account is registered with authentication authorization. In addition, the trunking system has an session initiation protocol (SIP) authentication authorization at a SIP level, which uses a traditional user name and pass word for a digest authentication, that is, a 401 or 407 authentication challenge message is performed with the user name and password, and reference may be made to a standard (Request For Comments, RFC) 3261 for details; moreover, for the purpose of security of various application services in the trunking system, it is also necessary to perform an authentication authorization to a terminal.

In the prior art, the user has to perform the authentication authorization of the account. A trunking service and a private voice call have the SIP authentication authorization, and other application services also have their own authentication authorizations. User names and pass words for various authentication authorizations are saved respectively, but there may be information on the user names and the pass words, posing a great threat to security.

SUMMARY

Embodiments of the present disclosure provide a unified authentication method for application in a trunking system, a server and a terminal. By using a User ID as a unified identifier for application services, an authentication to the application services is effectively combined with a user logon, such that a unified authentication authorization is achieved and security of the trunking system is improved.

In a first aspect, an embodiment of the present disclosure provides a unified authentication method for application in a trunking system, including:

receiving, by an application service network element of a server, a registration request transmitted by a terminal, where the registration request carries a token indicating a unique identity of a user initiating the registration request and an identification of the user, and the token is assigned by an authorization authentication network element of the server to the user when the user logs onto the terminal;

performing, by the application service network element of the server, a registration to the terminal according to the identification, and transmitting the token to the authorization authentication network element of the server;

performing, by the authorization authentication network element of the server, a token authorization to the user according to the token; and performing, by the application service network element of the server, an application service interaction with the terminal if the token authorization is passed.

In a first possible implementation of the first aspect, before the receiving, by the application service network element of the server, the registration request transmitted by the terminal, the method further includes:

receiving, by the authorization authentication network element of the server, a logon request transmitted by the user through the terminal, where the logon request carries the identification;

performing, by the authorization authentication network element of the server, an authentication authorization to the user according to the identification;

assigning, by the authorization authentication network element of the server, the token to the user if the authentication authorization is passed; and transmitting, by the authorization authentication network element of the server, a logon response message to the terminal, where the logon response message carries the token.

In a second possible implementation of the first aspect, before the receiving, by the application service network element of the server, the registration request transmitted by the terminal, the method further includes:

receiving, by the authorization authentication network element of the server, a logon request transmitted by the user through the terminal, where the logon request carries the identification;

performing, by the authorization authentication network element of the server, an authentication authorization to the user according to the identification;

assigning, by the authorization authentication network element of the server, the token to the user, and configuring a token expiration time if the authentication authorization is passed; and transmitting, by the authorization authentication network element of the server, a logon response message to the terminal, where the logon response message carries the token and the token expiration time.

With reference to the second possible implementation of the first aspect, in a third possible implementation of the first aspect, before the performing, by the application service network element of the server, the application service interaction with the terminal if the token authorization is passed, the method further includes:

receiving, by the authorization authentication network element of the server, a refresh message transmitted by the terminal before the token expiration time expires; and reassigning, by the authorization authentication network element of the server, the token and the token expiration time to the terminal according to the refresh message.

With reference to the second possible implementation of the first aspect, in a fourth possible implementation of the first aspect, before the performing, by the application service network element of the server, the application service interaction with the terminal if the token authorization is passed, the method further includes:

transmitting, by the authorization authentication network element of the server, a refresh notification to the terminal to enable the terminal to obtain a new token and a token expiration time thereof.

In a second aspect, an embodiment of the present disclosure provides a unified authentication method for application in a trunking system, including:

transmitting, by a terminal, a registration request to an application service network element of a server, where the registration request carries a token indicating a unique identity of a user initiating the registration request and an identification, enabling the application service network element of the server to perform a registration to the terminal according to the identification and transmit the token to an authorization authentication network element of the server; then the authorization authentication network element of the server performs a token authorization to the user according to the token, and the token is assigned by the authorization authentication network element of the server to the user when the user logs onto the terminal; and performing, by the terminal, an application service interaction with the application service network element of the server if the token authorization is passed.

In a first possible implementation of the second aspect, before the transmitting, by the terminal, the registration request to the application service network element of the server, the method further includes:

transmitting, by the terminal, a logon request to the authorization authentication network element of the server to enable the authorization authentication network element of the server to perform an authentication authorization to the user according to the identification, where the logon request carries the identification; and receiving, by the terminal, a logon response message transmitted by the authorization authentication network element of the server, where the logon response message carries the token.

In a second possible implementation of the second aspect, before the transmitting, by the terminal, the registration request to the application service network element of the server, the method further includes:

transmitting, by the terminal, a logon request to the authorization authentication network element of the server to enable the authorization authentication network element of the server to perform an authentication authorization to the user according to the identification, where the logon request carries the identification; and receiving, by the terminal, a logon response message transmitted by the authorization authentication network element of the server, where the logon response message carries the token and a token expiration time.

With reference to the second possible implementation of the second aspect, in a third possible implementation of the second aspect, before the performing, by the terminal, the application service interaction with the application service network element of the server if the token authorization is passed, the method further includes:

transmitting, by the terminal, a refresh message to the authorization authentication network element of the server before the token expiration time expires; and receiving, by the terminal, the token and the token expiration time reassigned by the authorization authentication network element of the server to the terminal according to the refresh message.

With reference to the second possible implementation of the second aspect, in a fourth possible implementation of the second aspect, before the performing, by the terminal, the application service interaction with the application service network element of the server if the token authorization is passed, the method further includes:

receiving, by the terminal, a refresh notification transmitted by the authorization authentication network element of the server after determining that the token expiration time expires;

transmitting, by the terminal, a refresh message to the authorization authentication network element of the server; and receiving, by the terminal, the token and the token expiration time reassigned by the authorization authentication network element of the server to the terminal according to the refresh message.

In a third aspect, an embodiment of the present disclosure provides a server, including: an application service network element and an authorization authentication network element, where the application service network element receives a registration request transmitted by a terminal, the registration request carries a token indicating a unique identity of a user initiating the registration request and an identification of the user, and the token is assigned by the authorization authentication network element to the user when the user logs onto the terminal;

the application service network element performs a registration to the terminal according to the identification, and transmits the token to the authorization authentication network element;

the authorization authentication network element performs a token authorization to the user according to the token; and the application service network element performs an application service interaction with the terminal if the token authorization is passed.

In a first possible implementation of the third aspect, before the application service network element receives the registration request transmitted by the terminal, the server further includes:

the authorization authentication network element receives a logon request transmitted by the user through the terminal, where the logon request carries the identification;

the authorization authentication network element performs an authentication authorization to the user according to the identification;

the authorization authentication network element assigns the token to the user if the authentication authorization is passed; and the authorization authentication network element transmits a logon response message to the terminal, where the logon response message carries the token.

In a second possible implementation of the third aspect, before the application service network element receives the registration request transmitted by the terminal, the server further includes:

the authorization authentication network element receives a logon request transmitted by the user through the terminal, where the logon request carries the identification;

the authorization authentication network element performs an authentication authorization to the user according to the identification;

the authorization authentication network element assigns the token to the user and configures a token expiration time if the authentication authorization is passed; and the authorization authentication network element transmits a logon response message to the terminal, where the logon response message carries the token and the token expiration time.

With reference to the second possible implementation of the third aspect, in a third possible implementation of the third aspect, before the application service network element performs the application service interaction with the terminal if the token authorization is passed, the server further includes:

the authorization authentication network element receives a refresh message transmitted by the terminal before the token expiration time expires; and the authorization authentication network element reassigns the token and the token expiration time to the terminal according to the refresh message.

With reference to the second possible implementation of the third aspect, in a fourth possible implementation of the third aspect, before the application service network element performs the application service interaction with the terminal if the token authorization is passed, the server further includes:

the authorization authentication network element transmits a refresh notification to the terminal to enable the terminal to obtain a new token and a token expiration time thereof.

In a fourth aspect, an embodiment of the present disclosure provides a terminal, including:

a transmitting module, configured to transmit a registration request to an application service network element of a server, where the registration request carries a token indicating a unique identity of a user initiating the registration request and an identification, enabling the application service network element of the server to perform a registration to the terminal according to the identification and transmit the token to an authorization authentication network element of the server which performs a token authorization to the user according to the token, and the token is assigned by the authorization authentication network element of the server to the user when the user logs onto the terminal; and an interacting module, configured to perform an application service interaction with the application service network element of the server if the token authorization is passed.

In a first possible implementation of the fourth aspect, the terminal further includes: a first receiving module, the transmitting module is configured to: before transmitting the registration request to the application service network element of the server, transmit a logon request to the authorization authentication network element of the server to enable the authorization authentication network element of the server to perform an authentication authorization to the user according to the identification, where the logon request carries the identification; and the first receiving module is configured to receive a logon response message transmitted by the authorization authentication network element of the server, where the logon response message carries the token.

In a second possible implementation of the fourth aspect, the terminal further includes: a second receiving module, the transmitting module is configured to: before transmitting the registration request to the application service network element of the server, transmit a logon request to the authorization authentication network element of the server to enable the authorization authentication network element of the server to perform an authentication authorization to the user according to the identification, where the logon request carries the identification; and the second receiving module is configured to receive a logon response message transmitted by the authorization authentication network element of the server, where the logon response message carries the token and a token expiration time.

With reference to the second possible implementation of the fourth aspect, in a third possible implementation of the fourth aspect, the transmitting module is further configured to: before the interacting module performs the application service interaction with the application service network element of the server if the token authorization is passed, transmit a refresh message to the authorization authentication network element of the server before the token expiration time expires; and the second receiving module is configured to receive the token and the token expiration time reassigned by the authorization authentication network element of the server to the terminal according to the refresh message.

With reference to the second possible implementation of the fourth aspect, in a fourth possible implementation of the fourth aspect, before the terminal performs the application service interaction with the application service network element of the application server if the token authorization is passed, the terminal further includes:

the second receiving module is further configured to: before the interacting module performs the application service interaction with the application service network element of the server if the token authorization is passed, receive a refresh notification transmitted by the authorization authentication network element of the server after determining that the token expiration time expires;

the transmitting module is further configured to transmit a refresh message to the authorization authentication network element of the server; and the second receiving module is further configured to receive the token and the token expiration time reassigned by the authorization authentication network element of the server to the terminal according to the refresh message.

Embodiments of the present disclosure provide a unified authentication method for application in a trunking system, a server and a terminal. An application service network element of a server receives a registration request transmitted by a terminal and transmits the registration request to an authorization authentication network element of the server, where the registration request carries a token indicating a unique identity of a user initiating the registration request, and the token is assigned by the authorization authentication network element of the server to the user when the user logs onto the terminal; then the authorization authentication network element of the server performs a token authorization to the user according to the token; and finally the application service network element of the server performs an application service interaction with the terminal if the token authorization is passed. During this process, an authentication to individual application service network element is performed through a successful logon of the terminal and an acquisition of the token assigned by the authorization authentication network element of the server to the user. The User ID is used as a unified identifier for application services in trunking communications, and an authentication to the application services is effectively combined with a user logon, such that a unified authentication authorization is achieved and security of the trunking system is improved.

DESCRIPTION OF EMBODIMENTS

In order to make objectives, technical solutions and advantages of embodiments of the present disclosure clearer, the technical solutions in the embodiments of the present disclosure will be described hereunder clearly and completely with reference to accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
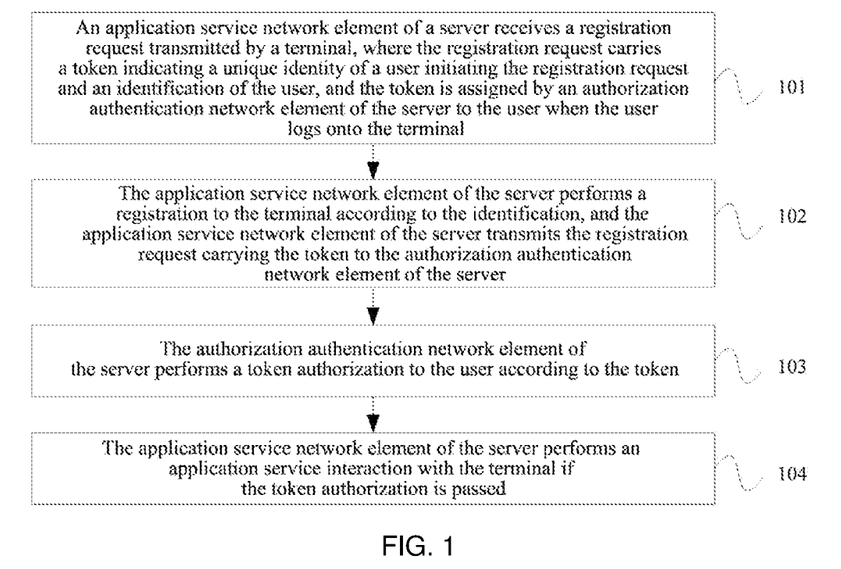
FIG. 1 is a flow chart of a unified authentication method for application in a trunking system according to embodiment 1 of the present disclosure.

FIG. 1 is a flow chart of a unified authentication method for application in a trunking system according to embodiment 1 of the present disclosure. In this embodiment, the present disclosure is described in detail from a perspective of a server. This embodiment is applicable to a scenario where a unified authentication is required in an LTE wideband trunking system for applications. In the embodiment of the present disclosure, an authorization authentication network element of the server may be, for instance, an authentication authorization service (AAS) logic network element, and an application service network element of the server may be, for instance, a user information service (UIS) logic network element, a session initiation protocol core (SIP core) logic network element, a short data service (SDS) logic network element or the like, but the present disclosure is not limited thereto. Specifically, this embodiment includes the following steps:

101, an application service network element of a server receives a registration request transmitted by a terminal, where the registration request carries a token indicating a unique identity of a user initiating the registration request and an identification of the user, and the token is assigned by an authorization authentication network element of the server to the user when the user logs onto the terminal.

In the embodiment of the present disclosure, the server may be, for instance, a single sign-on server. When it needs to perform a trunking service after the user gets a successful logon through a logon interface provided by the terminal and obtains a token (Token) assigned by the authorization authentication network element of the server to the user, the user transmits a registration request to the application service network element of the server to perform an authentication authorization of an application service, and performs an application service interaction with the application service network element of the server and legally uses a service provided by the application service network element only after the authentication authorization is completed. The token is assigned by the authorization authentication network element of the server to the user when the user logs onto the terminal.

102, the application service network element of the server performs a registration to the terminal according to the identification, and transmits the token to the authorization authentication network element of the server.

After receiving the registration request transmitted by the terminal, the application service network element of the server performs a registration to the terminal according to the identification and transmits the Token carried in the registration request to the authorization authentication network element of the server to enable the authorization authentication network element of the server to perform a token authorization to the user through the Token.

103, the authorization authentication network element of the server performs a token authorization to the user according to the token.

After receiving the token transmitted by the application service network element of the server, the authorization authentication network element of the server performs a token authorization to the user according to the token.

104, the application service network element of the server performs an application service interaction with the terminal if the token authorization is passed.

After the token authorization is completed, the user can perform an application service interaction with the application service network element of the server and can legally use a service provided by the application service network element.

Embodiments of the present disclosure provide a unified authentication method for application in a trunking system. An application service network element of a server receives a registration request transmitted by a terminal and transmits the registration request to an authorization authentication network element of the server, where the registration request carries a token indicating a unique identity of a user initiating the registration request, and the token is assigned by the authorization authentication network element of the server to the user when the user logs onto the terminal; then the authorization authentication network element of the server performs a token authorization to the user according to the token; and finally the application service network element of the server performs an application service interaction with the terminal if the token authorization is passed. During this process, an authentication to individual application service network element is performed through a successful logon of the terminal and an acquisition of the token assigned by the authorization authentication network element of the server to the user, the User ID is used as a unified identifier for application services in trunking communications, and an authentication to the application services is effectively combined with a user logon, such that a unified authentication authorization is achieved and security of the trunking system is improved.

Alternatively, in an embodiment of the present disclosure, before the application service network element of the server receives the registration request transmitted by the terminal, the authorization authentication network element of the server receives a logon request transmitted by the user through the terminal, where the logon request carries the identification; the authorization authentication network element of the server performs an authentication authorization to the user according to the identification; the authorization authentication network element of the server assigns the token to the user if the authentication authorization is passed; and the authorization authentication network element of the server transmits a logon response message to the terminal, where the logon response message carries the token.

Specifically, the authorization authentication network element of the server receives a logon request transmitted by the user through the terminal, where the logon request carries the identification of the user, such as a User ID and a pass word (Pass word) for logon; then, the authorization authentication network element of the server performs an authentication authorization to the user according to the User ID and the Pass word. If the authentication authorization is passed, then a token indicating a unique identity of the user is assigned to the user and the token is transmitted to the terminal through the logon response message.

Alternatively, in an embodiment of the present disclosure, before the application service network element of the server receives the registration request transmitted by the terminal, the authorization authentication network element of the server receives a logon request transmitted by the user through the terminal, where the logon request carries the identification of the user; the authorization authentication network element of the server performs an authentication authorization to the user according to the identification; if the authentication authorization is passed, the authorization authentication network element of the server assigns the token and a token expiration time to the user, and transmits the token and the token expiration time to the terminal through a logon response message.

Figure 2:
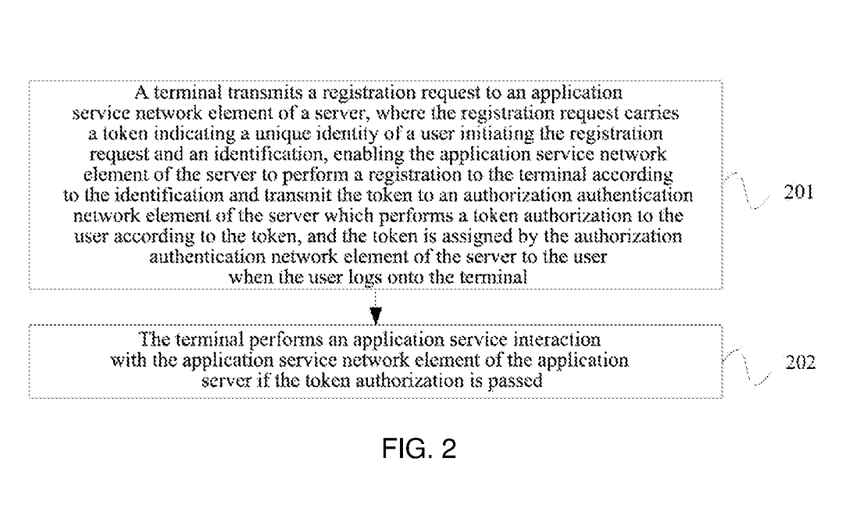
FIG. 2 is a flow chart of a unified authentication method for application in a trunking system according to embodiment 2 of the present disclosure.

FIG. 2 is a flow chart of a unified authentication method for application in a trunking system according to embodiment 2 of the present disclosure. In this embodiment, the present disclosure is described in detail from a perspective of a terminal. This embodiment is applicable to a scenario where a unified authentication is required in an LTE wideband trunking system for applications. Specifically, this embodiment includes the following steps:

201, a terminal transmits a registration request to an application service network element of a server, where the registration request carries a token indicating a unique identity of a user initiating the registration request and an identification, enabling the application service network element of the server to perform a registration to the terminal according to the identification and transmit the token to an authorization authentication network element of the server which performs a token authorization to the user according to the token, and the token is assigned by the authorization authentication network element of the server to the user when the user logs onto the terminal.

Reference may be made to the embodiment as shown in FIG. 1 for description about the application service network element of the server and the authorization authentication network element of the server in the present embodiment, which will not be repeated herein.

202, the terminal performs an application service interaction with the application service network element of the application server if the token authorization is passed.

After the token authorization is completed, the user can perform an application service interaction with the application service network element of the server and can legally use a service provided by the application service network element.

Embodiments of the present disclosure provide a unified authentication method for application in a trunking system. A terminal transmits a registration request carrying a token to an application service network element of a server to enable the application service network element of the server to transmit the registration request to an authorization authentication network element of the server which performs a token authorization to the user according to the token, and the application service network element of the server performs an application service interaction with the terminal if the token authorization is passed. During this process, an authentication to individual application service network element is performed through a successful logon of the terminal and an acquisition of the token assigned by the authorization authentication network element of the server to the terminal. The User ID is used as a unified identifier for application services in trunking communications, and an authentication to the application services is effectively combined with a user logon, such that a unified authentication authorization is achieved and security of the trunking system is improved.

Alternatively, in the second embodiment of the present disclosure, before transmitting the registration request to the application service network element of the server, the terminal also transmits a logon request to the authorization authentication network element of the server to enable the authorization authentication network element of the server to perform an authentication authorization to the user according to the identification, where the logon request carries the identification; then the terminal receives a logon response message transmitted by the authorization authentication network element of the server, where the logon response message carries the token.

Alternatively, in the second embodiment of the present disclosure, before transmitting the registration request to the application service network element of the server, the terminal also transmits a logon request to the authorization authentication network element of the server to enable the authorization authentication network element of the server to perform an authentication authorization to the user according to the identification, where the logon request carries the identification; then the terminal receives a logon response message transmitted by the authorization authentication network element of the server, where the logon response message carries the token and a token expiration time.

Figure 3:
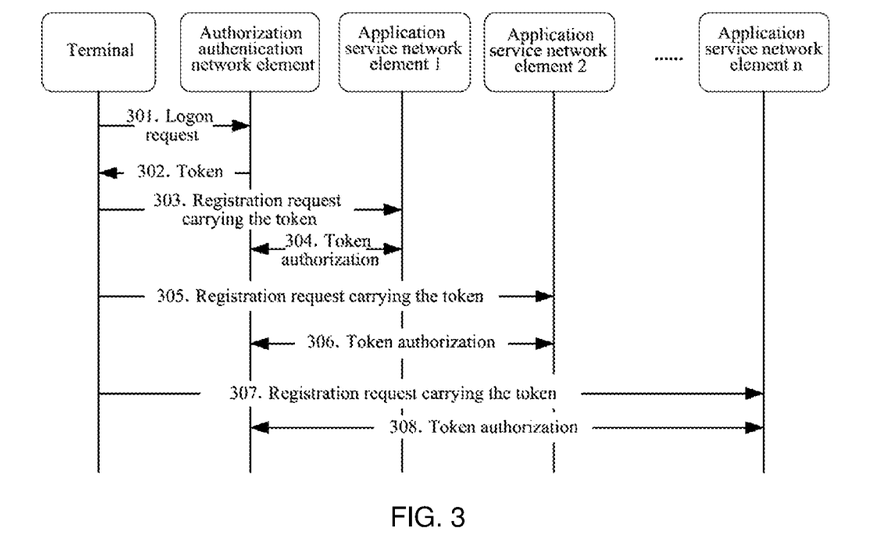
FIG. 3 is a process diagram of a unified authentication method for application in a trunking system according to embodiment 3 of the present disclosure.

FIG. 3 is a process diagram of a unified authentication method for application in a trunking system according to embodiment 3 of the present disclosure. The present disclosure is described in detail by taking an example in this embodiment where an authorization authentication network element of a server performs a unified authentication to application service network elements 1~n of the server after a logon of a user. Specifically, the following steps are included:

301, a terminal transmits a logon request to an authorization authentication network element of a server.

In this step, the terminal provides a logon interface. When the user needs to log on, the terminal accesses to the logon interface to transmit a logon (Logon) request to the server after a user name and a pass word are input. The authorization authentication network element of the server receives the logon request. In this process, alternatively, the logon request may carry a user identity (User ID) or the like, and the User ID is used as a unified identifier for application services in trunking communications.

302, the authorization authentication network element of the server transmits a token to the terminal.

Upon receiving the logon request, the authorization authentication network element of the server assigns a token to a user and transmits the token to the terminal after an authentication to the user is passed.

303, the terminal transmits a registration request carrying the token to an application service network element 1.

304, the application service network element 1 transmits the token to the authorization authentication network element for a token authorization.

In this step, the application service network element 1 of the server transmits the token to the authorization authentication network element of the server for a token authorization.

305, the terminal transmits a registration request carrying the token to an application service network element 2.

306, the application service network element 2 transmits the token to the authorization authentication network element for a token authorization.

307, the terminal transmits a registration request carrying the token to an application service network element 3.

308, the application service network element 3 transmits the token to the authorization authentication network element for a token authorization.

It can be seen from FIG. 3 that, the authorization authentication network element of the server provides a single sign-on server. The user accesses to the authorization authentication network element of the server for a logon authorization, and a token is assigned by the authorization authentication network element of the server to the user after a successful logon; then, the terminal carries the same token to access to an individual application service network element of the server for a registration, the individual application service network element accesses to the authorization authentication network element for a token authorization through the token. After the authorization is completed, the user can perform an application service interaction with the individual application service network element of the server, and can legally use a service provided by the individual application service network element.

It should be noted that, in this embodiment, Steps 303, 305 and 307 do not have a strict execution order, for instance, in other feasible implementations, the terminal may also access to the application service network element 2 or the application service network element n (n≠1) for a registration, and then access to the application service network element 1 for a registration.

Figure 4:
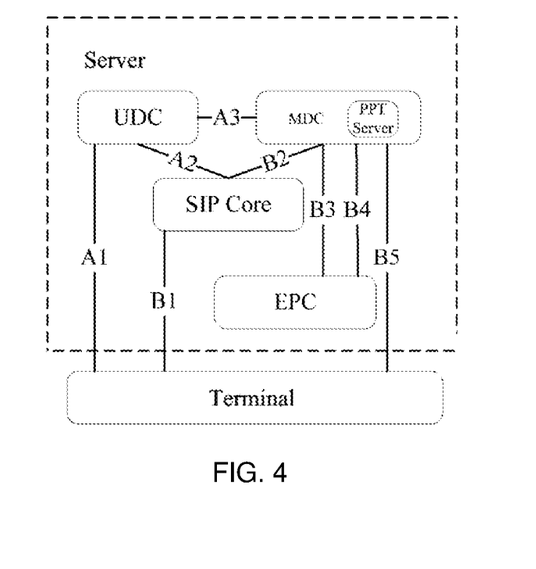
FIG. 4 is a logical framework diagram of a unified authentication method for application in a trunking system according to embodiment 4 of the present disclosure.

FIG. 4 is a logical framework diagram of a unified authentication method for application in a trunking system according to embodiment 4 of the present disclosure. Reference may be made to FIG. 4, and main logical network elements in a server include a user data center (UDC), a multimedia dispatch center (MDC), an evolved packet core (EPC), a session initiation protocol core (SIP core), etc., implementations of the subsequent process are described based on this framework.

The UDC has functions of undertaking management and configuration of account data of a user or a group and unifying a logon service, a user information service, a policy service or a security configuration service, which may provide an authentication authorization service (AAS), the user information service (UIS), quality of service control (QoS), a security service, user management, group management and the like, where the AAS is a unified authentication authorization center, which provides a logon management service of the user, an application service access address of the user, authentication services for applications, etc., and may be docketed to a standard third-party authentication, authorization and accounting (AAA) service. The UIS may provide an address book service, a user static data configuration service, a user right Profile download service and a group list download service provided for a group.

The MDC is service-orientated, which may provide a push to talk (PTT server), a private call service, a trunking service, a push to talk over cellular (POC), a short data service (SDS), an audio and video service, etc.

The SIP core is an SIP access routing center that provides an SIP registration and a routing service.

The EPC is a major component of system architecture evolution (SAE).

Figure 5:
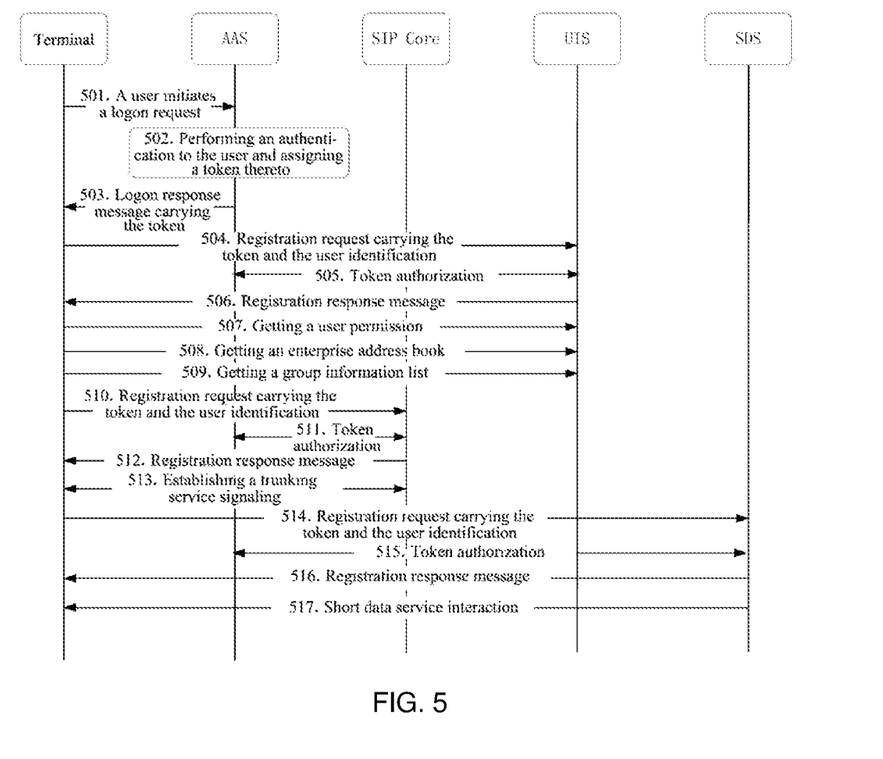
FIG. 5 is a signaling diagram of a unified authentication method for application in a trunking system according to embodiment 5 of the present disclosure.
Figure 6:
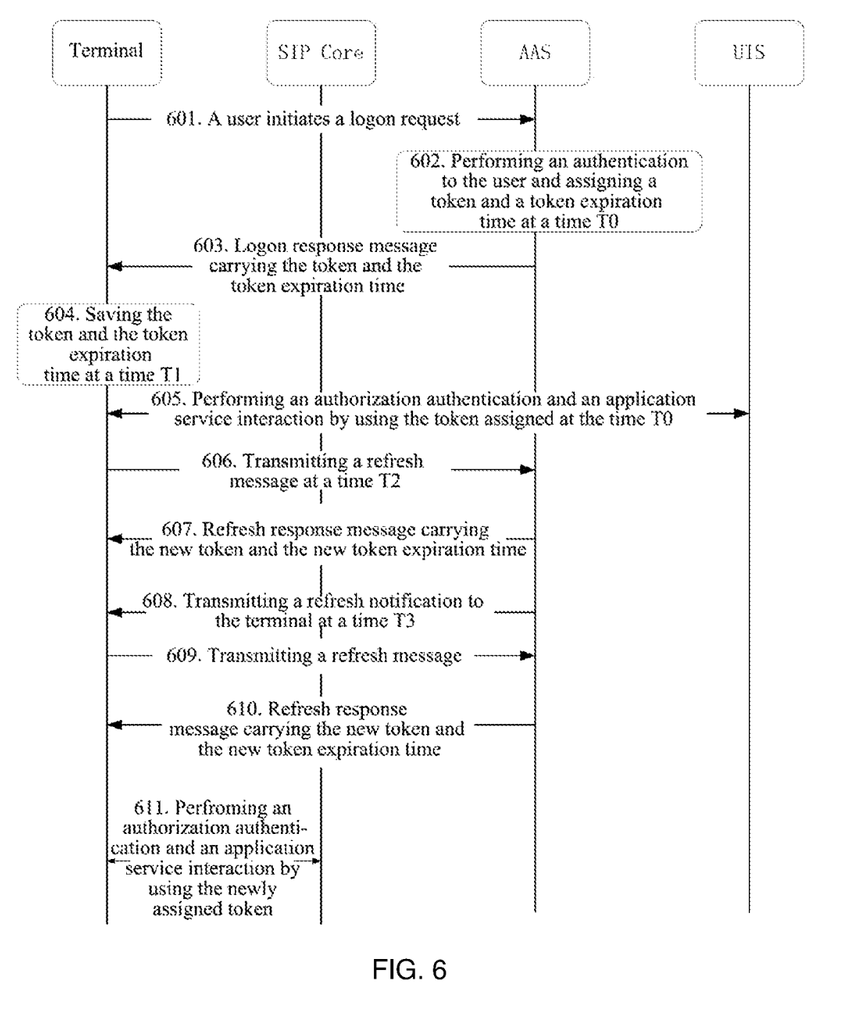
FIG. 6 is a signaling diagram of a unified authentication method for application in a trunking system according to embodiment 6 of the present disclosure.

As shown in FIG. 4, A1 is an interface between the UDC and the terminal, which uses a hypertext transfer protocol (HTTP)/signaling atm adaptation layer (SAAL) for communications; A2 is an interface between the UDC and the SIP core; A3 is an interface between the UDC and the MDC; B1 is an interface between the terminal and the SIP core, which uses the SIP for communications; B2 is an interface between the SIP core and the MDC, which uses the SIP for communications; B3 is an interface between the MDC and the EPC, which may be a policy and charging rules function (PCRF) interface or an Rx interface; B4 is an interface between the MDC and the EPC, which may be an MB2-C interface or an MB2-U interface; B5 is an interface between the MDC and the terminal, which may be a media-plane interface. The unified authentication method for the application in the trunking system according to the present disclosure will be described hereunder in detail with reference to FIG. 3. Reference may be made to FIG. 5 and FIG. 6 for details.

FIG. 5 is a signaling diagram of a unified authentication method for application in a trunking system according to embodiment 5 of the present disclosure. The present disclosure is described in detail by taking an example in this embodiment where an authorization authentication network element of a server is the AAS and application service network elements of the server are respectively the UIS, the SIP core or the SDS. The following steps are specifically included:

501, a user initiates a logon request.

A terminal accesses to a logon interface to initiate a logon process after inputting a user name and a pass word of a user, and transmits a logon (Logon) request to the AAS, where the logon request carries a user identification (User ID). Alternatively, the logon request also carries the pass word (Pass word) of the user and a position identification (Area ID) of an area to which the terminal belongs.

502, the AAS performs an authentication to the user and assigns a token thereto.

The AAS performs an authorization authentication to the user and assigns a unique identity token to the user after the authentication is passed. Alternatively, after the authentication is passed, the AAS also saves a correspondence between the User ID and the Area ID.

503, the AAS transmits a logon response message carrying the token to the terminal.

504, the terminal transmits a registration request carrying the token and the user identification to the UIS.

When the application service network element of the server is the UIS, the terminal transmits a registration request (Register) carrying the token and the user identification (User ID) to the UIS.

505, the UIS transmits the token to the AAS for a token authorization.

In this step, the UIS transmits the token to the AAS for a token authorization.

506, the UIS transmits a registration response message to the terminal.

When the token authorization performed by the AAS to the UIS is passed, the UIS returns a session identification (Session ID) to the terminal and transmits a registration response message to the terminal to inform the terminal that the token authorization is passed.

507, the terminal accesses to the UIS to get a user permission.

508, the terminal accesses to the UIS to get an enterprise address book.

509, the terminal accesses to the UIS to get a group information list.

In Steps 507~509, the terminal requests to download information about the user permission (Profile), contents of the enterprise address book (Address Book), the group information list (Group List) and the like from the UIS, where the group information list is used by the terminal for group scanning, group joining and displaying.

In addition, during an interaction between the terminal and the UIS in Steps 506~509, a Hypertext Transfer Protocol (HTTP) or the like may be used, but the present disclosure is not limited thereto.

510, the terminal transmits a registration request carrying the token and the user identification to the SIP core.

After the terminal interacts with the UIS to get the user permission and the group information list, if the terminal has a trunking permission, then in this step, the terminal initiates an SIP registration to the SIP core, and carries a User ID and a unique identity token acquired after a successful logon.

511, the SIP core transmits the token to the AAS for a token authorization.

After receiving the registration request transmitted by the terminal, the SIP core transmits the token and the User ID carried in the registration request to the AAS to enable the AAS to perform a token authentication to the user.

512, the SIP core transmits a registration response message to the terminal.

If the token authorization is passed, the SIP core transmits a registration response message to the terminal. For instance, the SIP core returns a 200OK response to the terminal.

513, the terminal establishes a trunking service signaling with the SIP Core.

After the token authorization is passed, the terminal may perform a trunking service signaling establishment process with the SIP core.

In Steps 510~513 described above, during the interaction between the terminal and the SIP core, there isn't a specific distinction among a private call, a trunking and a short message of the SIP at an application level, and applications of the SIP core are registered in a centralized way.

In addition, during the interaction between the terminal and the SIP core in Steps 510~513, a protocol such as a super SIP protocol or the like may be used, but the present disclosure is not limited thereto.

514, the terminal transmits a registration request carrying the token and the user identification to the SDS.

After the terminal interacts with the UIS to get the user permission and the group information list, if the terminal has a permission of short data service, then in this step, the terminal initiates a registration to the SDS, and carries a User ID and a unique identity token acquired after a successful logon.

515, the SDS transmits the token to the AAS for a token authorization.

After receiving the registration request transmitted by the terminal, the SDS transmits the token and the User ID carried in the registration request to the AAS to enable the AAS to perform a token authorization to the user.

516, the SDS transmits a registration response message to the terminal.

If the token authorization is passed, the SDS transmits a registration response message to the terminal. For instance, the SIP core returns a registration command acknowledgment (ACK) to the terminal.

517, the terminal performs a short data service interaction with the SDS.

After the token authorization is passed, the terminal may perform a short data service interaction with the SDS.

During the interactions between the terminal and the SDS in Steps 514~517 described above, a protocol such as an extensible messaging and presence protocol (XMPP) may be used, but the present disclosure is not limited thereto.

In addition, it should be noted that the interactions between the terminal and the SIP core described above (i.e., Steps 510~513) and the interactions between the terminal and the SDS do not have a strict order. For instance, in other feasible implementations, the terminal may first interact with the SDS and then with the SIP core; or, the terminal only interacts with the SIP core; or, the terminal only interacts with the SDS.

FIG. 6 is a signaling diagram of a unified authentication method for application in a trunking system according to embodiment 6 of the present disclosure. Compared with the embodiment as shown in FIG. 5, in this embodiment, upon receiving a registration request transmitted by the terminal, the authorization authentication network element of the server assigns a token to the terminal and also assigns a token expiration time for the token after performing an authentication to the terminal, the following steps are specifically included:

601, a user initiates a registration request.

602, the AAS performs an authentication to the user and assigns a token and a token expiration time at a time T0.

In this step, besides assigning a token to the user, the AAS also assigns a token expiration time corresponding to the token.

603, the AAS transmits a logon response message carrying the token and the token expiration time to the terminal.

604, the terminal saves the token and the token expiration time at a time T1.

Upon receiving the logon response message, the terminal saves the token and the token expiration time at the current time T1. For instance, assuming that T0 is 12:00, T1 is 12:01, and the token expiration time is 20 minutes, then the token assigned at the time T0 will expire at 12:21.

605, the terminal and the UIS perform an authorization authentication and an application service interaction by using the token assigned at the time T0 for.

The terminal executes an application registration before the token expiration time expires, for instance, the terminal accesses to the UIS for registration and performs subsequent downloading of the user permission, the contents of the enterprise address book and the group information list. Reference may be made to Steps 507~509 described above for details, which will not be repeated herein.

606, the terminal transmits a refresh message to the AAS at a time T2.

Before the token expiration time expires, the terminal transmits a refresh message to the AAS to acquire a new token and a token expiration time thereof. For instance, at a time T2, when T2=T1+the token expiration time*90%, following the example in Step 604, the terminal transmits a refresh message to the AAS to acquire a new token and a token expiration time thereof when T2 is 12:19.

607, the AAS transmits a refresh response message carrying the new token and the new token expiration time to the terminal.

It should be noted that, in addition to a case where the terminal may actively transmit a refresh process to the AAS to acquire a new token and a token expiration time thereof, there is also a case where the AAS may actively transmit a refresh notification to the terminal to enable the terminal to initiate a token refresh process to the AAS upon receiving the refresh notification transmitted by the AAS, reference may be made to Steps 608 for details.

608, the AAS transmits a refresh notification to the terminal at a time T3.

The AAS transmits a refresh notification to the terminal before the token expiration time expires to enable the terminal to acquire a new token and a token expiration time thereof. For instance, when the terminal initiates a refresh process at the time T3, where T3=T0+the token expiration time, following the example in Step 604, then when T3 is 12:20, the terminal transmits a refresh message to the AAS to obtain a new token and a token expiration time.

609, the terminal transmits a refresh message to the AAS.

The terminal transmits a refresh message to the AAS to acquire a new token and a token expiration time thereof.

610, the AAS transmits a refresh response message carrying the new token and the new token expiration time to the terminal.

Steps 608~610 described above may be regarded as an abnormal protection process, that is, when the terminal does not initiate a refresh process at the time T1, that is, Steps 608~610 are started only when Steps 606 and 607 described above are not executed. Of course, the terminal initiating the refresh process and the AAS informing the terminal of initiating the refresh process may be treated as parallel schemes, but the present disclosure is not limited thereto.

611, the terminal and the SIP core perform an authorization authentication and an application service interaction by using the newly assigned token.

Figure 7:
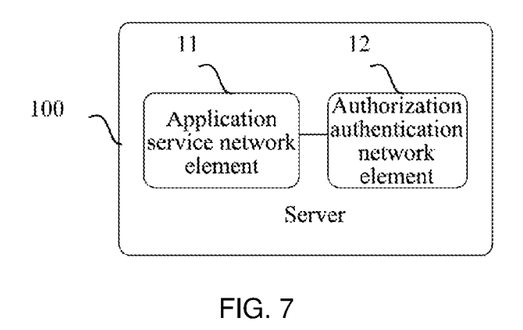
FIG. 7 is a structural diagram of a server according to embodiment 1 of the present disclosure.

FIG. 7 is a structural diagram of a server according to embodiment 1 of the present disclosure. The server provided in this embodiment may implement steps of a server-applicable method provided by any of the embodiments of the present disclosure. Specifically, the server provided in this embodiment specifically includes an application service network element 11 and an authorization authentication network element 12.

The application service network element 11 receives a registration request transmitted by a terminal, where the registration request carries a token indicating a unique identity of a user initiating the registration request and an identification of the user, and the token is assigned by the authorization authentication network element 12 to the user when the user logs onto the terminal.

The application service network element 11 performs a registration to the terminal according to the identification, and transmits the token to the authorization authentication network element 12.

The authorization authentication network element 12 performs a token authorization to the user according to the token.

The application service network element 11 performs an application service interaction with the terminal if the token authorization is passed.

Embodiments of the present disclosure provide a server. An application service network element of the server receives a registration request transmitted by a terminal and transmits the registration request to an authorization authentication network element of the server, where the registration request carries a token indicating a unique identity of a user initiating the registration request, and the token is assigned by the authorization authentication network element of the server to the user when the user logs onto the terminal; then the authorization authentication network element performs a token authorization to the user according to the token; and finally the application service network element performs an application service interaction with the terminal if the token authorization is passed. During this process, an authentication to individual application service network element is performed through a successful logon of the terminal and an acquisition of the token assigned by the authorization authentication network element of the server to the user. The User ID is used as a unified identifier for application services in trunking communications, and an authentication to the application services is effectively combined with a user logon, such that a unified authentication authorization is achieved and security of the trunking system is improved.

Alternatively, in an embodiment of the present disclosure, before the application service network element 11 receives the registration request transmitted by the terminal, the server further includes:

the authorization authentication network element 12 receives a logon request transmitted by the user through the terminal, where the logon request carries the identification;

the authorization authentication network element 12 performs an authentication authorization to the user according to the identification;

the authorization authentication network element 12 assigns the token to the user if the authentication authorization is passed; and the authorization authentication network element 12 transmits a logon response message to the terminal, where the logon response message carries the token.

Alternatively, in an embodiment of the present disclosure, before the application service network element 11 receives the registration request transmitted by the terminal, the server further includes:

the authorization authentication network element 12 receives a logon request transmitted by the user through the terminal, where the logon request carries the identification;

the authorization authentication network element 12 performs an authentication authorization to the user according to the identification;

the authorization authentication network element 12 assigns the token to the user and configures a token expiration time if the authentication authorization is passed; and the authorization authentication network element 12 transmits a logon response message to the terminal, where the logon response message carries the token and the token expiration time.

Alternatively, in an embodiment of the present disclosure, before the application service network element 11 performs the application service interaction with the terminal if the token authorization is passed, the server further includes:

the authorization authentication network element 12 receives a refresh message transmitted by the terminal before the token expiration time expires; and the authorization authentication network element 12 reassigns the token and the token expiration time to the terminal according to the refresh message.

Alternatively, in an embodiment of the present disclosure, before the application service network element 11 performs the application service interaction with the terminal if the token authorization is passed, the server further includes:

the authorization authentication network element 12 transmits a refresh notification to the terminal to enable the terminal to acquire a new token and a token expiration time thereof.

Figure 8:
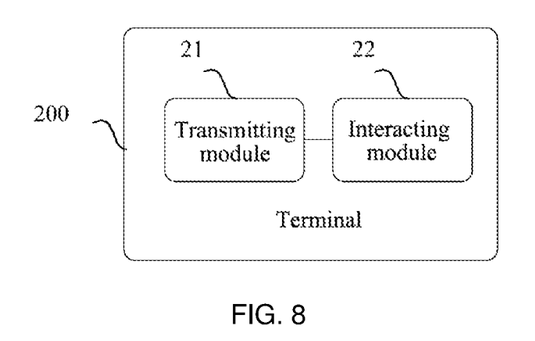
FIG. 8 is a structural diagram of a terminal according to embodiment 1 of the present disclosure.

FIG. 8 is a structural diagram of a terminal according to embodiment 1 of the present disclosure. The terminal provided in this embodiment may implement steps of a terminal-applicable method provided by any of the embodiments of the present disclosure. Specifically, the terminal provided in this embodiment specifically includes:

a transmitting module 21, configured to transmit a registration request to an application service network element of a server, where the registration request carries a token indicating a unique identity of a user initiating the registration request and an identification, enabling the application service network element of the server to perform a registration to the terminal according to the identification and transmit the token to an authorization authentication network element of the server which performs a token authorization to the user according to the token, and the token is assigned by the authorization authentication network element of the server to the user when the user logs onto the terminal; and an interacting module 22, configured to perform an application service interaction with the application service network element of the application server if the token authorization is passed.

Figure 9:
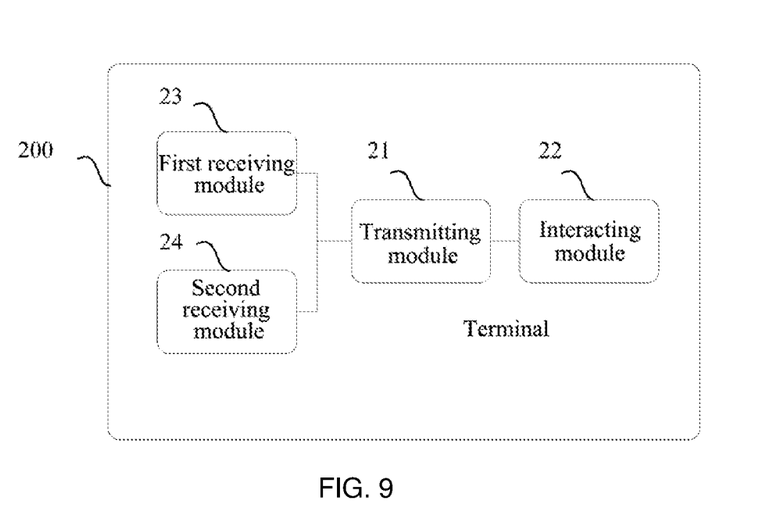
FIG. 9 is a structural diagram of a terminal according to embodiment 2 of the present disclosure.

FIG. 9 is a structural diagram of a terminal according to embodiment 2 of the present disclosure. As shown in FIG. 9, the terminal provided in this embodiment further includes a first receiving module 23 based on the terminal as shown in FIG. 8.

The transmitting module 21 is configured to: before transmitting the registration request to the application service network element of the server, transmit a logon request to the authorization authentication network element of the server to enable the authorization authentication network element of the server to perform an authentication authorization to the user according to the identification, where the logon request carries the identification.

The first receiving module 23 is configured to receive a logon response message transmitted by the authorization authentication network element of the server, where the logon response message carries the token.

Reference may be made to FIG. 9 again, and the terminal also includes: a second receiving module 24.

The transmitting module 21 is configured to: before transmitting the registration request to the application service network element of the server, transmit a logon request to the authorization authentication network element of the server to enable the authorization authentication network element of the server to perform an authentication authorization to the user according to the identification, where the logon request carries the identification.

The second receiving module 24 is configured to receive a logon response message transmitted by the authorization authentication network element of the server, where the logon response message carries the token and a token expiration time.

Alternatively, in an embodiment of the present disclosure, the transmitting module 21 is further configured to: before the interacting module 22 performs the application service interaction with the application service network element of the application server if the token authorization is passed, transmit a refresh message to the authorization authentication network element of the server before the token expiration time expires.

The second receiving module 24 is configured to receive the token and the token expiration time reassigned by the authorization authentication network element of the server to the terminal according to the refresh message.

Alternatively, before the terminal performs the application service interaction with the application service network element of the application server if the token authorization is passed, the terminal further includes:

the second receiving module 24 is further configured to: before the interacting module 22 performs the application service interaction with the application service network element of the application server if the token authorization is passed, receive a refresh notification transmitted by the authorization authentication network element of the server after determining that the token expiration time expires;

the transmitting module 21 is further configured to transmit a refresh message to the authorization authentication network element of the server; and the second receiving module 24 is further configured to receive the token and the token expiration time reassigned by the authorization authentication network element of the server to the terminal according to the refresh message.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A unified authentication method for providing different application services in a trunking system, wherein the trunking system comprises an authorization authentication network element and multiple application service network elements of a server, and wherein the authorization authentication network element is an authentication authorization server (AAS) logic network element and the multiple application service network elements comprise a user information server (UIS) logic network element, a session initiation protocol core (SIP) core, logic network element, a short data service (SDS) logic network element, comprising:

receiving, by one application service network element of the server of the multiple application service network elements of the server, a registration request transmitted by a terminal, wherein the registration request carries a token indicating a unique identity of a user initiating the registration request and an identification of the user, and the token is assigned by the authorization authentication network element of the server to the user when the user logs onto the terminal;

performing, by the one application service network element of the server of the multiple application service network elements of the server, a registration to the terminal according to the identification, and transmitting the token to the authorization authentication network element of the server;

performing, by the authorization authentication network element of the server, a token authorization to the user according to the token; and performing, by the one application service network element of the server of the multiple application service network elements of the server, an application service interaction with the terminal if the token authorization is passed.

2. The method according to claim 1, before the receiving, by the one application service network element of the server of the multiple application service network elements of the server, the registration request transmitted by the terminal, further comprising:

receiving, by the authorization authentication network element of the server, a logon request transmitted by the user through the terminal, wherein the logon request carries the identification;

performing, by the authorization authentication network element of the server, an authentication authorization to the user according to the identification;

assigning, by the authorization authentication network element of the server, the token to the user if the authentication authorization is passed; and transmitting, by the authorization authentication network element of the server, a logon response message to the terminal, wherein the logon response message carries the token.

3. The method according to claim 1, before the receiving, by the one application service network element of the server of the multiple application service network elements of the server, the registration request transmitted by the terminal, further comprising:

receiving, by the authorization authentication network element of the server, a logon request transmitted by the user through the terminal, wherein the logon request carries the identification;

performing, by the authorization authentication network element of the server, an authentication authorization to the user according to the identification;

assigning, by the authorization authentication network element of the server, the token to the user and configuring a token expiration time if the authentication authorization is passed; and transmitting, by the authorization authentication network element of the server, a logon response message to the terminal, wherein the logon response message carries the token and the token expiration time.

4. The method according to claim 3, before the performing, by the one application service network element of the server of the multiple application service network elements of the server, the application service interaction with the terminal if the token authorization is passed, further comprising:

receiving, by the authorization authentication network element of the server, a refresh message transmitted by the terminal before the token expiration time expires; and reassigning, by the authorization authentication network element of the server, the token and the token expiration time to the terminal according to the refresh message.

5. The method according to claim 3, before the performing, by the one application service network element of the server of the multiple application service network elements of the server, the application service interaction with the terminal if the token authorization is passed, further comprising:

transmitting, by the authorization authentication network element of the server, a refresh notification to the terminal to enable the terminal to acquire a new token and a token expiration time.

6. The method according to claim 1, further comprising:

performing, by each of the other multiple application service network elements of the server, the token authorization with the authorization authentication network element according to the same token to provide respective different application services to the terminal so as to implement a unified authentication authorization of each of the multiple application service network elements of the server.

7. A unified authentication method for providing different application services in a trunking system, wherein the trunking system comprises an authorization authentication network element and multiple application service network elements of a server, and wherein the authorization authentication network element is an authentication authorization server (AAS) logic network element and the multiple application service network elements comprise a user information server (UIS) logic network element, a session initiation protocol core (SIP) core, logic network element, a short data service (SDS) logic network element, comprising:

transmitting, by a terminal, a registration request to one application service network element of a server of the multiple application service network elements of the server, wherein the registration request carries a token indicating a unique identity of a user initiating the registration request and an identification, enabling the application service network element of the one server of the multiple application service network elements of the server to perform a registration to the terminal according to the identification and transmit the token to the authorization authentication network element of the server which performs a token authorization to the user according to the token, and the token is assigned by the authorization authentication network element of the server to the user when the user logs onto the terminal; and performing, by the terminal, an application service interaction with the one application service network element of the server of the multiple application service network elements of the server if the token authorization is passed.

8. The method according to claim 7, before the transmitting, by the terminal, the registration request to the one application service network element of the server of the multiple application service network elements of the server, further comprising:

transmitting, by the terminal, a logon request to the authorization authentication network element of the server to enable the authorization authentication network element of the server to perform an authentication authorization to the user according to the identification, wherein the logon request carries the identification; and receiving, by the terminal, a logon response message transmitted by the authorization authentication network element of the server, wherein the logon response message carries the token.

9. The method according to claim 7, before the transmitting, by the terminal, the registration request to the one application service network element of the server of the multiple application service network elements of the server, further comprising:
  transmitting, by the terminal, a logon request to the authorization authentication network element of the server to enable the authorization authentication network element of the server to perform an authentication authorization to the user according to the identification, wherein the logon request carries the identification; and
  receiving, by the terminal, a logon response message transmitted by the authorization authentication network element of the server, wherein the logon response message carries the token and a token expiration time.

10. The method according to claim 9, before the performing, by the terminal, the application service interaction with the one application service network element of the application server of the multiple application service network elements of the server if the token authorization is passed, further comprising:
  transmitting, by the terminal, a refresh message to the authorization authentication network element of the server before the token expiration time expires; and
  receiving, by the terminal, the token and the token expiration time reassigned by the authorization authentication network element of the server to the terminal according to the refresh message.

11. The method according to claim 9, before the performing, by the terminal, the application service interaction with the one application service network element of the application server of the multiple application service network elements of the server if the token authorization is passed, further comprising:
  receiving, by the terminal, a refresh notification transmitted by the authorization authentication network element of the server after determining that the token expiration time expires;
  transmitting, by the terminal, a refresh message to the authorization authentication network element of the server; and
  receiving, by the terminal, the token and the token expiration time reassigned by the authorization authentication network element of the server to the terminal according to the refresh message.

12. A server, comprising: multiple application service network elements and an authorization authentication network element, wherein the authorization authentication network element is an authentication authorization server (AAS) logic network element and the multiple application service network elements comprise a user information server (UIS) logic network element, a session initiation protocol core (SIP) core, logic network element, a short data service (SDS) logic network element;
  wherein one application service network element of the multiple application service network elements receives a registration request transmitted by a terminal, the registration request carries a token indicating a unique identity of a user initiating the registration request and an identification of the user, and the token is assigned by the authorization authentication network element to the user when the user logs onto the terminal;
  the one application service network element of the multiple application service network elements performs a registration to the terminal according to the identification, and transmits the token to the authorization authentication network element;
  the authorization authentication network element performs a token authorization to the user according to the token; and
  the one application service network element of the multiple application service network elements performs an application service interaction with the terminal if the token authorization is passed.

13. The server according to claim 12, before the one application service network element of the multiple application service network elements receives the registration request transmitted by the terminal, further comprising:
  the authorization authentication network element receives a logon request transmitted by the user through the terminal, wherein the logon request carries the identification;
  the authorization authentication network element performs an authentication authorization to the user according to the identification;
  the authorization authentication network element assigns the token to the user if the authentication authorization is passed; and
  the authorization authentication network element transmits a logon response message to the terminal, wherein the logon response message carries the token.

14. The server according to claim 12, before the one application service network element of the multiple application service network elements receives the registration request transmitted by the terminal, further comprising:
  the authorization authentication network element receives a logon request transmitted by the user through the terminal, wherein the logon request carries the identification;
  the authorization authentication network element performs an authentication authorization to the user according to the identification;
  the authorization authentication network element assigns the token to the user and configures a token expiration time if the authentication authorization is passed; and
  the authorization authentication network element transmits a logon response message to the terminal, wherein the logon response message carries the token and the token expiration time.

15. The server according to claim 14, before the one application service network element of the multiple application service network elements performs the application service interaction with the terminal if the token authorization is passed, further comprising:
  the authorization authentication network element receives a refresh message transmitted by the terminal before the token expiration time expires; and
  the authorization authentication network element reassigns the token and the token expiration time to the terminal according to the refresh message.

16. The server according to claim 14, before the one application service network element of the multiple application service network elements performs the application service interaction with the terminal if the token authorization is passed, further comprising:
  the authorization authentication network element transmits a refresh notification to the terminal to enable the terminal to obtain a new token and a token expiration time.

17. A terminal, comprising:
a transmitting module, configured to transmit a registration request to one application service network element of a server of multiple application service network elements of the server, wherein the multiple application service network elements comprise a user information server (UIS) logic network element, a session initiation protocol core (SIP) core, logic network element, a short data service (SDS) logic network element, wherein the registration request carries a token indicating a unique identity of a user initiating the registration request and an identification, enabling the one application service network element of the server of the multiple application service network elements of the server to perform a registration to the terminal according to the identification and transmit the token to an authorization authentication network element of the server which performs a token authorization to the user according to the token, wherein the authorization authentication network element is an authentication authorization server (AAS) logic network element, and the token is assigned by the authorization authentication network element of the server to the user when the user logs onto the terminal; and
an interacting module, configured to perform an application service interaction with the one application service network element of the application server of the multiple application service network elements of the server if the token authorization is passed.

18. The terminal according to claim 17, further comprising: a first receiving module,
the transmitting module is configured to: before transmitting the registration request to the one application service network element of the server of the multiple application service network elements of the server, transmit a logon request to the authorization authentication network element of the server to enable the authorization authentication network element of the server to perform an authentication authorization to the user according to the identification, wherein the logon request carries the identification; and
the first receiving module is configured to receive a logon response message transmitted by the authorization authentication network element of the server, wherein the logon response message carries the token.

19. The terminal according to claim 17, further comprising: a second receiving module,
the transmitting module is configured to: before transmitting the registration request to the one application service network element of the server of the multiple application service network elements of the server, transmit a logon request to the authorization authentication network element of the server to enable the authorization authentication network element of the server to perform an authentication authorization to the user according to the identification, wherein the logon request carries the identification; and
the second receiving module is configured to receive a logon response message transmitted by the authorization authentication network element of the server, wherein the logon response message carries the token and a token expiration time.

20. The terminal according to claim 19, wherein,
the transmitting module is further configured to: before the interacting module performs the application service interaction with the one application service network element of the application server of the multiple application service network elements of the server if the token authorization is passed, transmit a refresh message to the authorization authentication network element of the server before the token expiration time expires; and
the second receiving module is configured to receive the token and the token expiration time reassigned by the authorization authentication network element of the server to the terminal according to the refresh message.

21. The terminal according to claim 19, wherein, before the terminal performs the application service interaction with the one application service network element of the application server of the multiple application service network elements of the server if the token authorization is passed, further comprising:
the second receiving module is further configured to: before the interacting module performs the application service interaction with the one application service network element of the application server of the multiple application service network elements of the server if the token authorization is passed, receive a refresh notification transmitted by the authorization authentication network element of the server after determining that the token expiration time expires;
the transmitting module is further configured to transmit a refresh message to the authorization authentication network element of the server; and
the second receiving module is further configured to receive the token and the token expiration time reassigned by the authorization authentication network element of the server to the terminal according to the refresh message.

* * * * *